United States Patent Office 2,901,699
Patented Aug. 25, 1959

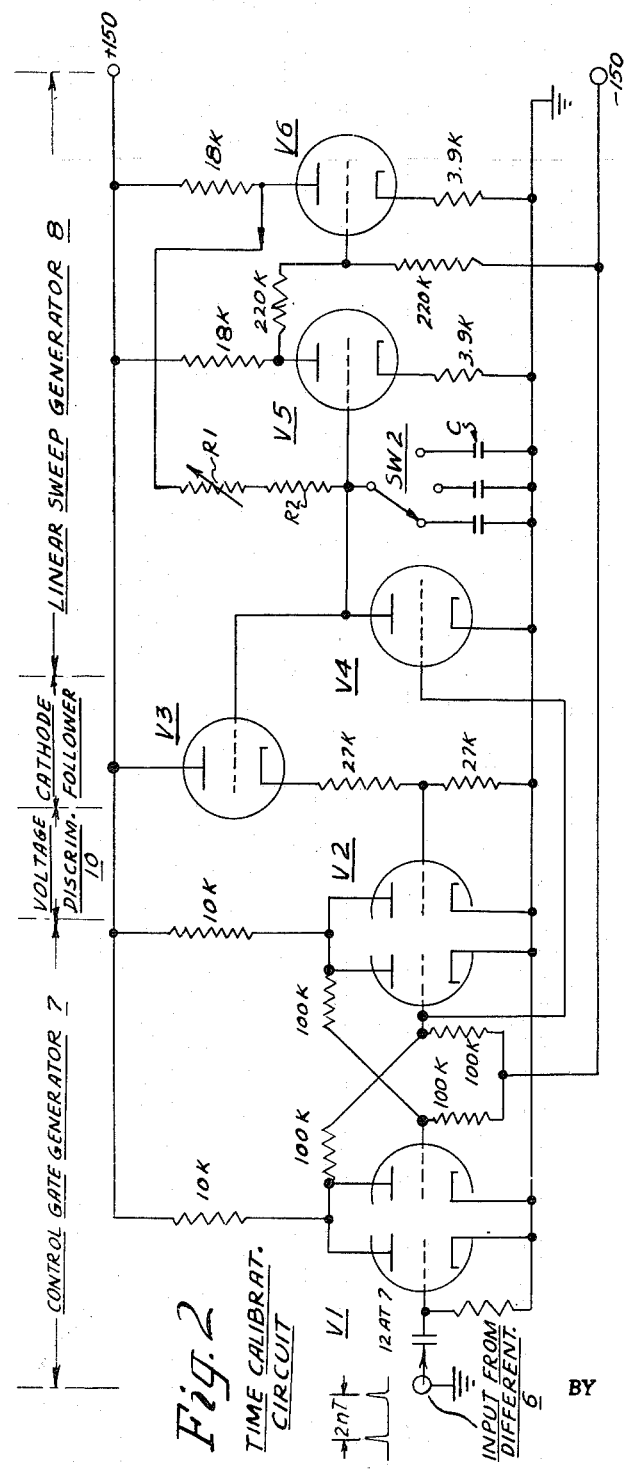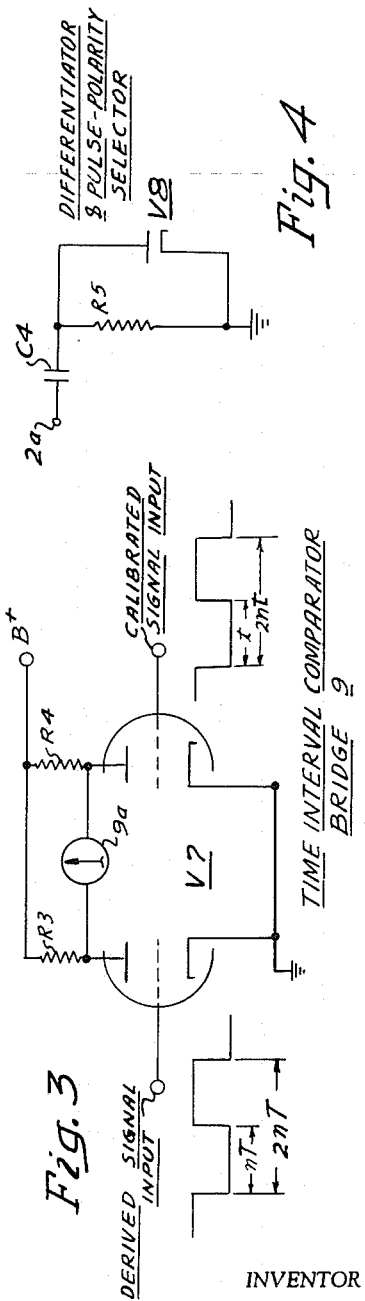

2,901,699

FREQUENCY MEASURING INSTRUMENT

Joseph W. Motz, Silver Spring, Md., and John H. Reaves, McLean, Va.

Application April 19, 1957, Serial No. 653,923

10 Claims. (Cl. 324—78)

This invention relates to frequency measurements and particularly contemplate a novel apparatus and method by which the frequency of an unknown signal or sound can be instantaneously determined by comparing the period of the signal to be measured with a calibrated time interval which can be varied to cover all periods in a specified frequency range.

An immediate object of this invention is to provide a frequency measuring apparatus which is capable of measuring the instantaneous period of an unknown signal.

Another object of this invention is to provide a frequency measuring apparatus which is capable of determining the frequency of an unknown signal by comparing its period with that of a time-calibrating signal.

A further object of this invention is to provide a frequency measuring device in which the fundamental frequency of a complex signal such as a sound source can readily be determined.

It is a still further object of this invention to provide a frequency measuring device which is particularly suitable for use in connection with the tuning of musical instruments, and in testing or calibrating any periodic phenomenon.

An additional object of this invention is to provide a frequency measuring instrument which can accurately measure the frequency of transient signals.

Further objects of this invention will become apparent as the description proceeds. One embodiment of the invention is illustrated in the accompanying drawings in which:

Fig. 2 is a circuit schematic detailing the construction of the time calibrating portion of the apparatus shown in Fig. 1;

Fig. 3 shows the circuit construction of a time interval comparator employed in the embodiment of Fig. 1 and Fig. 4 is a circuit diagram of a differentiator and pulse-polarity selector employed in connection with the present invention.

Figure 1:
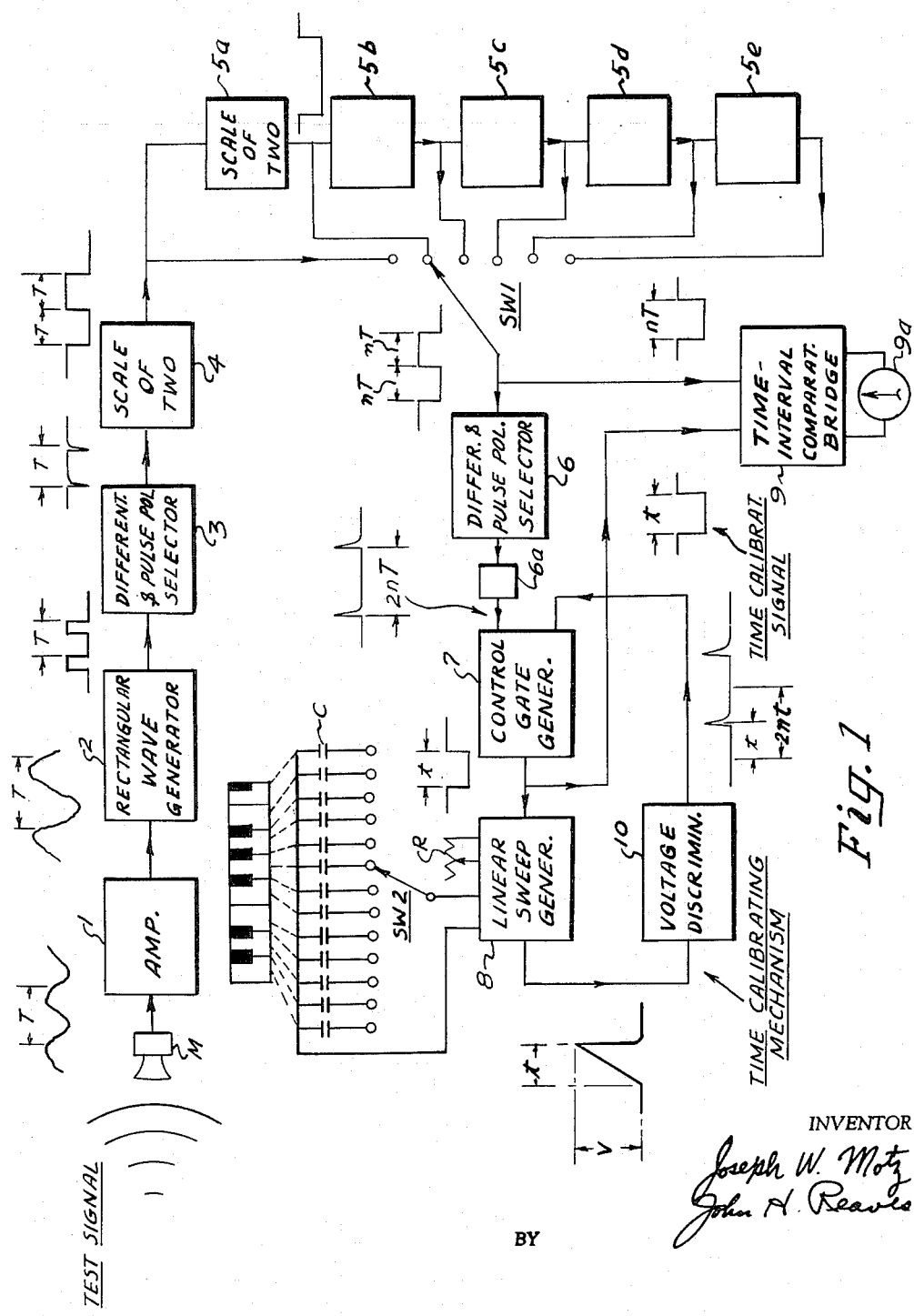
Fig. 1 is a block diagram of a particular embodiment of the invention.

The present invention provides means for determining the fundamental frequency of an unknown signal by comparing the period of the fundamental frequency contained in the unknown signal with a precisely defined time period. The invention also provides means for effecting such comparison over a particular frequency range commensurate with the frequency range of the unknown signal.

Time interval comparison in accordance with the principles of this invention is accomplished by converting the wave-form of an unknown signal into a symmetrical square wave having a period equal to a multiple, for example two, of the unknown signal. The first transition of each cycle of such square-wave is then employed to generate a rectangular wave having a period equal to the square wave but containing an adjustable time interval. Means are provided for calibrating the time interval of the rectangular wave, and such time interval may then be compared with the half-period of the square wave by means of a special bridge circuit forming part of the invention. When the bridge is balanced, the period of the test signal will be equal to the calibrated time interval. The frequency of the unknown signal is thereby determined.

In order to cover a particular frequency range, a frequency division system preferably employing a series of binary scalers may be used. If the lowest frequency to be measured has a period equal to $t_0$, then the calibrated time interval of the referred-to rectangular wave must cover only the range from $t_0$ to $$\frac{t_0}{2}$$

For all frequencies greater than twice the lowest such frequency, the binary scalers convert the frequencies so that they are kept within the range covered by that of the referred-to rectangular wave.

One embodiment of the invention is schematically illustrated in Fig. 1 of the drawings. The unknown, or test signal, the frequency of which is to be measured is indicated in Fig. 1 as emanating from any signal frequency source which may be a sound source for purposes of illustration. The test signal is initially detected by a transducer such as the microphone M. The signal is then amplified in an amplifier 1 and applied to a rectangular wave generator 2. The waveforms of the signals in the various circuit components are symbolically illustrated alongside each component in Fig. 1. Since the invention is singularly adapted to measure frequencies of transient signals such as periodic waveforms the amplitudes of which may decay with time, the amplifier 1 is chosen so that its output amplitude is indepedent of the amplitude of the input signal. Any consequent clipping of the signal is immaterial since the waveform of the test signal does not affect the operation of the subsequent portions of the circuit.

The rectangular wave generator 2 may be of a conventional type such as described, for example, on page 204 (Fig. 41.$a$) of "Electronic Experimental Techniques" by Elmore and Sands. It will be noted in Fig. 1 that the recurrence period T of the rectangular waves generated by generator 2 corresponds to that of the test signal being measured.

A differentiator and pulse-polarity selector circuit 3 receives the output of rectangular wave generator 2 and converts the trailing edges of the rectangular waves into sharpened pulses of like repetition period T and having a polarity as indicated in Fig. 1. The construction of the differentiator and pulse-polarity selector is detailed in Fig. 4 to be described.

The referred-to differentiated pulses are then employed to trigger a scale-of-two scaler 4 which may be of the type described on page 210 of the above referred-to text. The output of the scale-of-two circuit 4 then comprises a repetitious square wave signal each cycle of which has a duration or half-period corresponding to the period T. In this manner the repetition period of the particular frequency being analyzed is manifested as the half-period of a symmetrical square wave.

The output signal from scaler 4 may then be applied to a series of scale-of-two scaler circuits 5$a$, 5$b$, 5$c$, 5$d$ and 5$e$ of similar construction as the scaler 4. The purpose of the scaling circuits 5$a$–5$e$ is to scale down the converted test signal to a particular sub-multiple corresponding to that of a standard calibrating source to be described. It will be understood that the number of such scaling units shown in Fig. 1 is illustrative and any convenient number can be employed commensurate with the frequency range of the unknown or test signal. For example, when the invention is employed in connection with the tuning of musical instruments, each scale-of-two circuit 5a etc., can be made to correspond to a separate octave of the musical scale. The output of each scale of two circuit is applied, respectively, to respective contacts of a switch SW1. The contactor of the switch SW1 is connected to a second differentiator and pulse-polarity selector 6 and to a time interval comparator bridge 9 to be described. The pulse-polarity selector 6 is of the same type as the corresponding member 3. The output from each of the scaler units 4, 5a etc., as manifested on each of the contacts of switch SW1 is symbolized in Fig. 1 by the square wave representation having the indicated half-period $nT$ where $n$ corresponds to the division factor provided by the particular scaler unit selected by switch SW1.

The differentiator and pulse-polarity selector 6 provides sharpened pulses having a rate of recurrence of $2nT$. These pulses are applied through an inverter 6a to a control gate generator 7. The portion of the apparatus including control gate generator 7, linear sweep generator 8 and voltage discriminator 10 comprises a time-calibrating mechanism which provides the referred-to precise time-calibrated rectangular wave as one input to the time-interval comparator bridge 9. The second input to such bridge is obtained from the contactor of switch SW1. Hence, a comparison between the period of the test wave being analyzed and a calibrated time interval can be made in the bridge circuit 9 by means of the balance indicator 9a. The time calibrating circuit diagrammatically shown in Fig. 1 may preferably be specifically embodied in the circuit detailed in Fig. 2. The over-all operation of the referred-to time calibrating mechanism will first be described by reference to Fig. 1.

The linear sweep generator 8 is a saw-tooth wave generator the sweep rate of which is determined by an RC circuit comprising the frequency calibrator control R and a selected one of the capacitors C. Any one of the capacitors designated as C can be selectively integrated into the sweep circuit by means of selector switch SW2. The capacitor are illustrated in Fig. 1 as corresponding to the lowest octave of a piano keyboard to indicate the manner in which the apparatus of this invention can be employed to tune musical instruments. It will be readily apparent however that the particular frequency selected can optionally correspond to that of any signal to be analyzed since the invention is not limited to the frequency range of a musical scale.

The time calibrator further includes a voltage discriminator 10 which limits the amplitude of the saw-tooth wave generated by linear sweep generator 8, by passing only the portion of the signal which exceeds the amplitude V indicated in the waveform to the left of voltage discriminator 10 in Fig. 1. The voltage discriminator 10, as will be described, conducts when the amplitude of the input signal applied thereto exceeds the value V. When thus energized, the voltage discriminator applies a signal to the control gate generator 7, which immediately resets the sweep generator 8 to terminate the sweep.

Fig. 2 shows a particular implementation of the time calibrating circuit comprising the elements 7, 8 and 10 in Fig. 1. The portions of the circuit shown in Fig. 2 corresponding to the respective blocks 7, 8 and 10 in Fig. 1 bear like designations in Fig. 2.

The linear sweep generator (element 8 in Fig. 1) comprises the circuit including tubes V4, V5, V6, resistors R1 and R2 and capacitors C in Fig. 2. Tube V4, when rendered conducting, provides a discharge path for the particular capacitor C selected by switch SW2. The capacitors C correspond to the like designated capacitors indicated in Fig. 1. The capacitors C together with adjustable resistor R1 and R2 comprise an RC or charging circuit, the period of which is defined by the particular value of the capacitance and resistance selected. When tube V4 is cut off, the selected capacitor C will be charged from the indicated plus 150-volt source at a rate determined by the referred-to RC value. A linear sweep signal of the type symbolized adjacent the linear sweep generator 8 in Fig. 1 is established in such described manner.

The cascade connected amplifier tubes V5, V6, together with the feed-back circuit from the plate of V6 to the grid of tube V5 insure linearity of the sweep signal. Specifically, the voltage across the selected capacitor C is amplified by V5 and V6 which have a combined gain of unity and the signal is fed back through resistors R1 and R2. Discharge of the capacitor C is accomplished through sweep control tube V4.

As indicated in Fig. 1, the linear sweep signal generated by sweep generator 8 is timed to occur in synchronism with the square-wave signals obtained from frequency divider stages 4, 5a etc. The bi-stable circuit comprising tubes V1 and V2 of control gate generator 7 in Fig. 2 provides for such synchronism. The bi-stable circuit comprises a pair of twin triodes connected as indicated. The sharpened pulses from differentiator 6 are inverted in inverter 6a and, as indicated in Fig. 1, have a repetition rate of $2nT$. These pulses are applied to the grid of tube V1. Since the grid of control tube V4 is connected to the output of tube V1, when the later is rendered conducting by the applied signal from differentiator 6, tube V4 will be cut off and the selected capacitor C will be charged from the plus 150-volt source as described.

The right-hand section of tube V2 is employed as a voltage discriminator. That is, the voltage across the selected capacitor C is applied through cathode follower V3 to the right-hand grid of tube V2. It will be apparent that the voltage across the capacitors must reach a predetermined level, corresponding, for example, to the amplitude V indicated in Fig. 1, before tube V2 will conduct. As soon as such amplitude level is reached, the consequent conduction of the right-hand section of tube V2 functions in a characteristic manner to reset tube V1 of the bi-stable circuit. When tube V1 is cut off, the resulting positive signal applied to the grid of sweep control tube V4 renders the latter conducting to produce instantaneous discharge of the selected capacitor C thus terminating the sweep signal. In this manner, the application of each triggering pulse from pulse-polarity selector 6 initiates a linear sweep having an amplitude V and a period corresponding to $t$.

Referring to Fig. 1, it will be apparent from the above description, that the selected capacitor C results in the selection of a time interval which determines the reference period for frequency comparison.

The construction and operation of the time interval comparator 9 in Fig. 1 will be apparent by reference to Fig. 3. The comparator comprises separate signal amplifiers such as each section of the twin triode V7 and a null-balance meter 9a connected across the anodes. The plate load resistors R3, R4 are of equal value. The test signal input applied to the left-hand section of tube V7 correspond to the square-wave output signal derived from the selected one of the scale-of-two circuits 4, 5a etc., as previously described, whereas the rectangular wave time calibrating signal from the time calibrating circuit (Fig. 2) is applied to the grid of the right-hand section. It will therefore be apparent, that the meter will be in balance only when the period $nT$ which is a multiple of the test signal period is equal to the calibrated time interval $t$.

The construction of the previously referred-to differentiator and pulse-polarity selectors 3 and 6 (Fig. 1) is detailed in Fig. 4. Such devices comprise a diode V8 shunted by a resistor R5. A capacitor C4 is connected in series between the input terminal 2a and the anode of the diode. The differentiator and pulse-polarity selectors 3 and 6, function as follows. Application of the rectangular waves from either generator 2 or scale-of-two circuits 4a etc., across the resistor R5 and capacitor C4 results in differentiation of the rectangular wave. Because of the rectifying action of diode V8, only the negative differentiated pulse is utilized as indicated by the output wave forms adjacent the pulse selector 3 in Fig. 1.

The operation of the apparatus of this invention will be apparent from the above description. Briefly, a test signal to be analyzed, which may be in the form of a sound source, is applied to the microphone M and is converted into a rectangular wave having a repetition period T corresponding to that of the test signal by rectangular generator 2. The signal is then converted into a series of negative pulses having a like repetition period T and these pulses in turn energize a scale-of-two multi-vibrator 4. The resulting output signal is a square wave, having a half-period T corresponding to that of the test signal.

The scaler circuits 5a–5e provide suitable time division of the square wave signal into any desired submultiple. The square wave is then differentiated and employed to trigger the linear sweep generator 8. The sweep generator produces a wave which rises linearly with time. Since the amplitude of such wave is determined by discriminator 10 as described, there results a precise time calibrated signal having a duration $t$. The time interval comparator 9 is then employed to compare the time calibrating signal with the half-period of the square (reference) wave. Since the reference signal initiates the mechanism which generates the time-calibrating signal, it will be apparent from the above description that the reference, and time calibrating signals are always in synchronism.

The apparatus of the present invention is particularly suitable for use in measuring the frequencies of transient signals. In particular, a periodic wave form such as is represented in a signal resulitng when the key of a piano is struck, has a variable or decaying amplitude waveform. As is evident from the above description, energization of the generator 2 by amplifier 1 for only one period of the test signal is sufficient to effect a frequency determination.

While a preferred embodiment of the present invention has been disclosed, it will be understood that various modifications may be made in the specific construction illustrated and described without departing from the spirit or scope of the invention. It is not desired to be limited other than by the scope of the claims which follow.

What is claimed is:

1. Apparatus for measuring the instantaneous frequency of a periodic, recurring unknown signal comprising: means responsive to the unknown signal to be measured for generating a reference signal of predetermined wave-form having a duration corresponding to a function of the period of said signal, means responsive to said reference signal for generating a time calibrating signal having an adjustable, predetermined time period which can be varied means responsive to said time calibrating signal generating means for converting said time calibrating signal into a signal having a wave-form corresponding to that of said reference signal and means for comparing the respective durations of said reference, and said converted time calibrating signals.

2. The invention of claim 1 in which said reference signal generating means comprises a rectangular wave generator for generating a rectangular wave having a duration corresponding to a function of the period of said signal and said time calibrating signal generating means comprises means for generating a constant-slope ramp signal voltage which increases linearly with time and amplitude sensitive means for terminating the duration of said latter signal.

3. Apparatus for measuring the instantaneous frequency of a periodically recurring unknown signal comprising: means responsive to the unknown signal to be measured for generating a reference rectangular wave signal having a duration corresponding to the period of said signal, frequency dividing means responsive to said reference signal generating means for converting said reference signal into a square wave signal having a duration which is a multiple of said period, means responsive to said frequency dividing means for generating an adjustable rectangular time calibrating signal of predetermined duration and means for comparing the periods of said converted reference signal and said time calibrating signal respectively.

4. The invention of claim 3 in which said time calibrating signal generating means comprises means for generating a constant-slope ramp signal which increases linearly with time and means responsive to the occurrence of said converted reference signal for energizing said linearly increasing signal generating means.

5. The invention of claim 4 in which said linearly increasing signal generating means includes means for selectively varying the period of said linear sweep.

6. The invention of claim 3 in which said frequency dividing means comprises a series of cascaded scale-of-two counters and means for selectively connecting said linearly increasing signal generating means to one of said counters.

7. The invention of claim 3 in which said comparing means comprises a bridge circuit.

8. The invention of claim 5 in which said means for varying the period of said linearly increasing signal comprises a plurality of impedance means providing a range of adjustment corresponding to a musical scale.

9. The invention of claim 1 in which said time calibrating signal generating means comprises a pulse generator for periodically generating a gating pulse in response to the applied reference signals, a linearly increasing signal generator energized by said gating pulses and means for terminating the duration of said linearly increasing signal.

10. A device for measuring the instantaneous frequency of a periodically recurring test signal comprising: means for converting said test signal into a symmetrical square wave having a period equal to a multiple of the period of said test signal, means responsive to said converting means for generating a linearly increasing signal, means for adjusting the duration of said linearly increasing signal, means responsive to said linearly increasing signal generating means for generating a rectangular-wave signal having a duration determined by said linearly increasing signal and means for comparing the duration of said rectangular signal with the half-period of said square wave.

References Cited in the file of this patent

UNITED STATES PATENTS

| | | |
|---|---|---|
| 2,732,496 | Slonczewski | Jan. 24, 1956 |
| 2,756,336 | Christensen | July 24, 1956 |
| 2,806,953 | Krauss | Sept. 17, 1957 |